Patented Apr. 5, 1949

2,466,413

UNITED STATES PATENT OFFICE 2,466,413

METHOD OF PREPARATION OF HYDROCARBON-SUBSTITUTED HALOSILANES

William F. Gilliam, Schenectady, N. Y., and Robert N. Meals, Memphis, Tenn., assignors to General Electric Company, a corporation of New York No Drawing. Application February 21, 1946, Serial No. 649,395

10 Claims. (Cl. 260—448.2)

1

This invention relates to the preparation of organohalosilanes (organo-silicon halides) and more particularly to the production of hydrocarbon-substituted halosilanes (hydrocarbon-substituted silicon halides).

In Rochow Patent 2,380,995, and in Rochow and Gilliam Patent 2,383,818, which patents are assigned to the same assignee as the present invention, there are disclosed and broadly claimed methods of preparing organohalosilanes, which methods generally comprise effecting reaction between silicon and a hydrocarbon halide. In the more specific embodiments of the above-mentioned patents, the hydrocarbon halide is caused to react with the silicon component of a contact mass containing a metallic catalyst for the reaction, for instance copper, said contact mass being in the form of a solid, porous mass, e. g., preformed pellets, or a friable, oxidized alloy of the silicon and the metallic catalyst.

Reed and Coe Patent, 2,389,931, assigned to the assignee of the present application, discloses that mixtures of powdered silicon and powdered metallic catalyst, specifically copper, may be used in the above-described reaction. However, there is no teaching in this patent that the particle sizes and distribution, by weight, of the powdered silicon and the powdered metallic catalyst are important in obtaining certain subsequently-mentioned advantages.

The present invention differs from the invention disclosed in the aforementioned patents in that our method of preparing organohalosilanes comprises effecting reaction between the hydrocarbon halide and silicon in the presence of a metallic catalyst for the reaction, the silicon and metallic catalyst being present as finely divided powders admixed with each other, each powder being of specific particle size and distribution, by weight. Particularly, our invention relates to a method of preparing organohalosilanes which comprises effecting reaction between a hydrocarbon halide and the silicon component of a powder comprising (1) powdered silicon wherein the distribution, by weight, and the particle size, in microns, are as follows: 100% of the particles are smaller than 420 microns in diameter, from 90 to 100% of the particles are less than 149 microns in diameter and not more than 60% of the particles are less than 44 microns in diameter, and (2) a powdered metallic catalyst for the reaction wherein the distribution, by weight, and the particle size, in microns, are as follows: 100% of the particles are smaller than 420 microns, in diameter, from 85 to 100% of the particles are smaller than 44 microns, in diameter, and from 60 to 100% of the particles are smaller than 15 microns in diameter, the two powders being in the form of a substantially homogeneous mixture.

2

Briefly described, our invention resides in the improved method of preparing hydrocarbon-substituted halosilanes, e. g., alkyl chlorosilanes, bromosilanes, etc., aryl chlorosilanes, bromosilanes, etc., alkyl aryl chlorosilanes, bromosilanes, etc., wherein the hydrocarbon halide is caused to react with powdered silicon of certain particle size and distribution, by weight, within the specified particle size in the presence of a powdered metallic catalyst for the reaction, also of a specific particle size and distribution, by weight, within the specified particle size, the two powders having been previously admixed to form a substantially homogeneous mixture. By employing this mixture of powders in the specified distributions and aprticle sizes, we have discovered that good yields of the hydrocarbon-substituted halosilanes as well as increased yields of the presently more desirable dihydrocarbon-substituted dihalosilanes, e. g., dimethyldichlorosilane, are obtained.

Various methods may be employed for effecting reaction between the ingredients. For example, one method comprises bringing a hydrocarbon halide, particularly gaseous methyl chloride, into contact with a powder obtained by thoroughly mixing together powdered silicon and a powdered metallic catalyst for the reaction, e. g., copper, heating the said hydrocarbon halide and the silicon-containing powder at a temperature sufficiently high, e. g., from 200° to 500° C., to effect reaction between the hydrocarbon halide and the silicon component of the powder, and recovering the hydrocarbon-substituted halosilanes thus formed. For example, the effluent gaseous reaction products may be cooled by suitable means to obtain a condensate comprising the hydrocarbon-substituted halosilanes, specifically the methylchlorosilanes.

Previous to our discovery, difficulty was often encountered in controlling the temperature of the reaction between the hydrocarbon halide and the silicon since such a reaction is strongly exothermic once the reaction is initiated. In addition, the yields of the more desirable dihydrocarbon-substituted dihalosilanes, e. g., dimethyldichlorosilane, were of such a variable nature, and quite often present in decreased amounts, that it was usually difficult to predict what proportion of the yield of the hydrocarbon-substituted halosilanes would be the dihydrocarbon-substituted dihalosilanes. Such a situation was of considerable disadvantage in the preparation of these compounds under production conditions.

By means of our present invention, we have been able to obviate the above-mentioned disadvantages. In the practice of our invention, it is essential that the silicon and metallic catalyst powders be of certain particle sizes and distribution, by weight, as described above. Optimum results are obtained if from 80 to 100% of the metallic catalyst particles have a particle size which is smaller than 15 microns in diameter. It is also desirable that from 90 to 100% of the silicon particles have a particle size of from 105 to 149 microns in diameter. However, our invention is not to be construed as being limited to these percentages, by weight, and particle sizes, in microns. By means of our invention, it is possible to increase the yield of the dihydrocarbon-substituted dihalosilane in the reaction product and to control more easily the temperature and course of the reaction. In addition, the composition of the product and the yield of a given component, specifically dimethyldichlorosilane, can be predicted with greater certainty.

In order that those skilled in the art better may understand how the present invention may be practiced, the following examples are given by way of illustration and not by way of limitation. Each example is the average of the results obtained on two simultaneous runs using the identical reactants, i. e., methyl chloride and the same mixture of powders, the reaction being effected under concurrent and identical conditions, within the limits of experimental error.

The silicon and copper powders were separated into the specific particle size fractions by sifting the powders through the required sieves of the U. S. Standard Sieve Series (A. S. T. M. Standard), to give the desired particle size fractions. The following table shows the relationship between particle size, expressed in microns, and sieve size expressed in terms of standard sieves of the U. S. Standard Sieve Series.

| U. S. Sieve Numbers | | Diameter of Particles or Particle Size Expressed in Microns |
|---|---|---|
| Passing thru | Retained on | |
| −40 | ------ | Smaller than 420 |
| −60 | +100 | 149 to 250 |
| −100 | +140 | 105 to 149 |
| −140 | +200 | 74 to 105 |
| −200 | +325 | 44 to 74 |
| −325 | ------ | Less than 44 |

The diameter of the particles, or "particle size" referred to herein, is expressed in microns. The upper limit is defined by the size of the sieve opening (U. S. Standard Sieve Series) through which the particles passed and the lower limit is defined by the size of the sieve opening which retained the particles. For example, reference to particles having a diameter or a particle size less than 420 microns is intended to mean that the particles passed through a No. 40 sieve of the U. S. Standard Sieve Series. Reference to particles having a diameter or a particle size of from 74 to 105 microns means that the particles passed through a No. 140 sieve and were retained on a No. 200 sieve of the aforementioned sieve series.

For each run, exactly 180 grams of silicon powder and 20 grams copper powder, each powder being of specified size and distribution, by weight, were weighed into a screw-capped bottle and thoroughly mixed by shaking. Extreme care was taken to attain a substantially uniform mixture; once mixed, precaution was taken to prevent separation and segregation of the powders.

The reaction in each case was effected in the same manner. One leg of a U-shaped ¾-inch steel reactor was charged by pouring the mixture of silicon and copper powders carefully through a funnel into the reactor. The powder bed was kept in place by glass plugs at the top and the bottom. The system was purged with methyl chloride for about an hour and then the two reactors (for the simultaneous runs) were immersed in a salt bath at 300° C. The flow of gas, which was upward though the powder bed, was adjusted as closely as possible to 5 grams per hour, and the methyl-chlorosilanes were condensed at a temperature of −18° to −20° C., and the condensate analyzed. Under these conditions, negligible amounts of unreacted methyl chloride (B. P. −23.7° C would be present in the reaction product.

All the runs were conducted within the temperature range of 300–400° C. These runs were started at 300° C. and after the rate of the product obtained for each of the simultaneous runs fell below 1.5 cc. per hour for a 12-hour period, the temperature of the bath was increased to 325° C. This procedure was continued at intervals of 25° C. until a bath temperature of 400° C. was attained; at this point the run was discontinued when the product rate dropped below 1 cc. per hour.

During the early phases of many of the runs in which reaction is effected between the hydrocarbon halide and the silicon component of the mixture of powders, the amount of the dihydrocarbon-substituted dihalosilane in the condensed product may range anywhere from about 20 to 75 per cent, by weight, of the product obtained up to that time. Generally, in the type of reaction disclosed above, the proportion by weight of the dihydrocarbon-substituted dihalosilane in the condensed product decreases as the silicon is consumed. It is, therefore, essential in order to evaluate properly the effects of different mixtures of powders containing the silicon and metallic catalyst in varied particle sizes and distributions by weight, that due consideration be given to the overall picture. This may require that the per cent of the dihydrocarbon-substituted dihalosilane obtained in the condensed product at the end of the run be properly correlated with the actual amount, by weight, of this compound in the condensed product, the time required to obtain this amount of the compound, and the actual per cent of silicon utilized in the preparation of the compound.

Tables I and II show the distribution, by weight, of the particles of silicon and copper within the various particle sizes. Examples 1 and 2 employed the silicon and copper particle sizes within the limits of the claimed invention.

TABLE I

Silicon Particles

Screen analysis of powder in per cent by weight

| Example No. | 250 to 420 microns | 149 to 250 microns | 105 to 149 microns | 74 to 105 microns | 44 to 74 microns | Less than 44 microns |
|---|---|---|---|---|---|---|
| 1 | 0 | 0 | 0 | 2 | 39 | 59 |
| 2 | 0 | 0 | 77 | 22 | 1 | 0 |
| 3 | 0 | 0 | 1 | 86 | 13 | 0 |
| 4 | 0 | 90 | 10 | 0 | 0 | 0 |
| 5 | 0 | 90 | 10 | 0 | 0 | 0 |
| 6 | 0 | 0 | 1 | 86 | 13 | 0 |
| 7 | 0 | 90 | 10 | 0 | 0 | 0 |
| 8 | 0 | 90 | 10 | 0 | 0 | 0 |
| 9 | 0 | 0 | 77 | 22 | 1 | 0 |

TABLE II
COPPER PARTICLES
*Screen analysis of powder in per cent by weight*

| Example No. | 250 to 420 microns | 149 to 250 microns | 105 to 149 microns | 74 to 105 microns | 44 to 74 microns | Less than 44 microns |
|---|---|---|---|---|---|---|
| 1 | 0 | 0 | 0 | 0 | 0 | [1] 100 |
| 2 | 0 | 0 | 0 | 0 | 0 | [1] 100 |
| 3 | 0 | 0 | 0 | 82 | 15 | 3 |
| 4 | 0 | 0 | 0 | 0 | 0 | [2] 100 |
| 5 | 0 | 0 | 0 | 0 | 90 | 10 |
| 6 | 0 | 83 | 15 | 2 | 0 | 0 |
| 7 | 0 | 83 | 15 | 2 | 0 | 0 |
| 8 | 0 | 1 | 85 | 7 | 2 | 5 |
| 9 | 0 | 1 | 85 | 7 | 2 | 5 |

[1] Approximately 70% of the particles were below 15 microns in diameter.
[2] This powder was appreciably coarser than the powder sin Examples 1 and 2, and substantially less than 70% of the particles were smaller than 15 microns in diameter.

Table III shows the conditions of reaction used for each example. The heading "Weight of reaction product" is intended to include the entire product obtained by condensing, at −18° to −20° C., the effluent gases resulting from the reaction between the methyl chloride and the silicon.

TABLE III

| Example No. | Length of Run | Weight of Input CH₃Cl | Weight of Reaction Product | Bath Temp. |
|---|---|---|---|---|
| | Hours | Grams | Grams | °C. |
| 1 | 399 | 1,295 | 773 | 300–400 |
| 2 | 331 | 1,472 | 712 | 300–400 |
| 3 | 400 | 1,549 | 685 | 300–400 |
| 4 | 352 | 1,479 | 548 | 300–400 |
| 5 | 400 | 1,256 | 628 | 300–400 |
| 6 | 400 | 1,746 | 625 | 300–400 |
| 7 | 256 | 1,129 | 295 | 300–400 |
| 8 | 424 | 1,795 | 492 | 300–400 |
| 9 | 427 | 1,497 | 623 | 300–400 |

Table IV shows the results of analyzing the reaction product obtained in each example. The amount of each product obtained is expressed in per cent, by weight, of the total weight of the reaction product. The products listed as "Boiling below 66° C." include compounds boiling below methyltrichlorosilane, such as methyldichlorosilane (CH₃SiHCl₂), silicon tetrachloride (slight amounts or traces), trimethylchlorosilane [(CH₃)₃SiCl], and negligible amounts of methyl chloride, etc. Dimethyldichlorosilane $$[(CH_3)_2SiCl_2]$$

boiling at 70° C. at atmospheric pressure and methyltrichlorosilane (CH₃SiCl₃), boiling at 66° C. at atmospheric pressure, are, therefore, the only products boiling at or above 66° C. exclusive of the amount of material listed under the heading "Residue." Thus, the latter heading is intended to refer to those products having a boiling range higher than dimethyldichlorosilane.

TABLE IV
*Per cent[1] by weight of the reaction product*

| Example No. | Boiling Below 66° C. | CH₃SiCl₃ | (CH₃)₂SiCl₂ | Residue | Weight of (CH₃)₂SiCl₂ |
|---|---|---|---|---|---|
| | | | | | Grams |
| 1 | 15 | 28 | 48 | 6 | 371 |
| 2 | 16 | 30 | 44 | 6 | 314 |
| 3 | 17 | 50 | 22 | 6 | 151 |
| 4 | 17 | 45 | 27 | 5 | 148 |
| 5 | 25 | 41 | 23 | 9 | 145 |
| 6 | 36 | 46 | 11 | 2 | 69 |
| 7 | 17 | 65 | 9 | 5 | 27 |
| 8 | 17 | 52 | 19 | 7 | 94 |
| 9 | 17 | 51 | 21 | 7 | 131 |

[1] The total per cent of the reaction product is not equal to 100 per cent because of certain preventable handling losses.

In the following examples (the results of the reactions being shown in Tables V and VI), the same mixtures of powders were used as in Examples 1–6 and 9. For instance, the mixture of powders used in Example 1A was identical with the mixture of powders employed in Example 1 (supra), the powders used in Example 2A are the same as the powders employed in Example 2, etc. However, in the examples described below, the entire reaction in each case was conducted at a temperature of about 300° C. for the indicated length of time. The procedure for conducting the reactions in the following examples was the same as the procedure followed in Examples 1–9 (supra).

TABLE V

| Example No. | Length of Run | Weight of Input CH₃Cl | Weight of Reaction Product |
|---|---|---|---|
| | Hours | Grams | Grams |
| 1A | 103 | 372 | 348 |
| 2A | 91 | 446 | 325 |
| 3A | 136 | 525 | 361 |
| 4A | 184 | 806 | 345 |
| 5A | 184 | 553 | 351 |
| 6A | 123 | 578 | 209 |
| 9A | 151 | 483 | 271 |

TABLE VI
*Per cent [1] by weight of the reaction product*

| Example No. | Boiling Below 66° C. | CH₃SiCl₃ | (CH₃)₂SiCl₂ | Residue | Weight of (CH₃)₂SiCl₂ |
|---|---|---|---|---|---|
| | | | | | Grams |
| 1A | 12 | 24 | 55 | 6 | 192 |
| 2A | 12 | 17 | 61 | 6 | 198 |
| 3A | 14 | 51 | 25 | 6 | 90 |
| 4A | 17 | 38 | 34 | 5 | 117 |
| 5A | 26 | 38 | 23 | 9 | 81 |
| 6A | 16 | 50 | 24 | 4 | 50 |
| 9A | 16 | 49 | 23 | 8 | 62 |

[1] The total per cent of the reaction product is not equal to 100 per cent because of certain unpreventable handling losses.

It will be understood by those skilled in the art that our invention is not limited to the specific hydrocarbon halide used in the preceding illustrative examples and that any other hydrocarbon halide or mixture of hydrocarbon halides may be employed as a reactant with the silicon, the conditions of reaction generally being varied depending upon the particular end-products desired. In general, the vapor-phase reactions are preferred because they can be carried out more economically, may be controlled more easily and may be directed toward the production of the desired organohalosilanes.

Likewise, the invention is not limited to the specific temperatures or temperature ranges mentioned in the examples. However, the reaction temperature should not be so high as to cause an excessive deposition of carbon upon the unreacted silicon. In general, the reaction temperature to be used will vary with, for instance, the particular hydrocarbon halide employed, the particular catalyst used and the yields of the specific reaction products desired to be obtained from a particular starting hydrocarbon halide. At temperatures of the order of 200° C. the reaction proceeds much more slowly than at reaction temperatures around 250° to 400° C. At temperatures much above 400° C., in the case of methyl chloride, for example, there is a vigorous exothermic reaction which generally results in an undesirable deposition of carbon in the reaction tube. Optimum results usually are obtained within the more limited range of 250° to 400° C.

It will be understood by those skilled in the art that metallic catalysts other than powdered copper may be employed to form the powdered mixture with the silicon. Examples of such catalysts, in addition to copper, are nickel, tin, antimony, manganese, silver, titanium, etc.

As pointed out in U. S. Patent 2,380,997, issued August 7, 1945, to Winton I. Patnode, and assigned to the same assignee as the present application, the proportion, by weight, of silicon to the metallic catalyst may be varied over a wide range. Preferably, however, the mixture of powders consists substantially of a preponderant proportion of silicon and a minor proportion of copper or other metallic catalyst for the reaction between the silicon and the hydrocarbon halide. A more specific example of such a mixture of powders is the product obtained by mixing together, by weight, from 2 to 45 per cent of the metallic catalyst powder, specifically copper, and from 98 to 45 per cent of the silicon powder, these powders being present as particles within the limits of the specific sizes and proportions, by weight, embraced by our present invention. Particularly good results from a practical standpoint are obtained with a mixture of powders containing, by weight, from 5 to 25 per cent powdered copper and from 95 to 75 per cent powdered silicon.

With further reference to the production of methylchlorosilanes, it may be said that the efficient utilization of methyl chloride is enhanced as the proportion of the metallic catalyst, specifically copper, is increased up to about 10 per cent and that no material advantage from the standpoint of maximum yield of reaction products per unit weight of methyl chloride employed ordinarily accrues from using a mixture of powders in our invention containing much over 20 or 25 per cent copper.

The present invention provides a new and improved method for the production of alkyl halosilanes (e. g., methyl, ethyl, propyl, butyl, amyl, isoamyl, hexyl, etc., halosilanes), the aryl halosilanes (e. g., phenyl halosilanes, etc.), the aryl-substituted aliphatic halosilanes (e. g., benzyl, phenylethyl halosilanes), and the aliphatic-substituted aryl halosilanes (e. g., tolyl halosilanes, etc.).

The products of this invention have utility as intermediates in the preparation of other products. For instance, they may be employed as starting materials for the manufacture of silicone resins. They may also be used as agents for treating water-non-repellent bodies to make them water-repellent as disclosed and claimed in the patent to Winton I. Patnode, U. S. 2,306,222, issued December 22, 1945, and assigned to the same assignee as the present invention.

What we claim as new and desire to secure by Letters Patent of the United States is:

1. The method of preparing hydrocarbon-substituted halogenosilanes which comprises effecting reaction at an elevated temperature between a hydrocarbon halide and the silicon component of a powder comprising (1) powdered silicon wherein the distribution, by weight, and the particle size, in microns, are as follows: 100% of the particles are smaller than 420 microns in diameter, from 90 to 100% are less than 149 microns in diameter and not more than 60% are less than 44 microns in diameter, and (2) a powdered metallic catalyst for the reaction wherein the distribution, by weight, and the particle size, in microns, are as follows: 100% of the particles are smaller than 420 microns in diameter, from 85 to 100% are smaller than 44 microns in diameter and from 60 to 100% are smaller than 15 microns in diameter, the two powders being in the form of a substantially homogeneous mixture.

2. The method of preparing hydrocarbon-substituted halogenosilanes which comprises effecting reaction at an elevated temperature between a hydrocarbon halide and the silicon component of a powder comprising (1) powdered silicon wherein the distribution, by weight, and the particle size, in microns, are as follows: 100% of the particles are smaller than 420 microns in diameter, from 90 to 100% are less than 149 microns in diameter and not more than 60% are less than 44 microns in diameter, and (2) powdered copper wherein the distribution, by weight, and the particle size, in microns, are as follows: 100% of the particles are smaller than 420 microns in diameter, from 85 to 100% are smaller than 44 microns in diameter and from 60 to 100% are smaller than 15 microns in diameter, the two powders being in the form of a substantially homogeneous mixture.

3. The method of preparing aryl halosilanes which comprises effecting reaction at a temperature of from about 200° to 500° C. between an aryl halide and the silicon component of a powder comprising (1) powdered silicon wherein the distribution, by weight, and the particle size, in microns, are as follows: 100% of the particles are smaller than 420 microns in diameter, from 90 to 100% are less than 149 microns in diameter and not more than 60% are less than 44 microns in diameter, and (2) a powdered metallic catalyst for the reaction wherein the distribution, by weight, and the particle size, in microns, are as follows: 100% of the particles are smaller than 420 microns in diameter, from 85 to 100% are smaller than 44 microns in diameter and from 60 to 100% are smaller than 15 microns in diameter, the two powders being in the form of a substantially homogeneous mixture.

4. The method of preparing alkyl halosilanes which comprises effecting reaction at a temperature of from about 200° to 500° C. between an alkyl halide and the silicon component of a powder comprising (1) powdered silicon wherein the distribution, by weight, and the particle size, in microns, are as follows: 100% of the particles are smaller than 420 microns in diameter, from 90 to 100% are less than 149 microns in diameter and not more than 60% are less than 44 microns in diameter, and (2) a powdered metallic catalyst for the reaction wherein the distribution, by weight, and the particle size, in microns, are as follows: 100% of the particles are smaller than 420 microns in diameter, from 85 to 100% are smaller than 44 microns in diameter and from 60 to 100% are smaller than 15 microns in diameter, the two powders being in the form of a substantially homogeneous mixture.

5. The method of preparing alkyl halosilanes which comprises effecting reaction at a temperature of from about 200° to 500° C. between an alkyl halide and the silicon component of a powder comprising (1) powdered silicon wherein the distribution, by weight, and the particle size, in microns, are as follows: 100% of the particles are smaller than 420 microns in diameter, from 90 to 100% are less than 149 microns in diameter and not more than 60% are less than 44 microns in diameter, and (2) powdered copper wherein the distribution, by weight, and the particle size, in microns, are as follows: 100% of the particles are smaller than 420 microns in diameter, from 85 to 100% are smaller than 44 microns in diameter and from 60 to 100% are smaller than 15 microns in diameter, the two powders being in the form of a substantially homogeneous mixture.

6. The method of preparing methylchlorosilanes which comprises effecting reaction at a temperature of from about 200° to 500° C. between methyl chloride and the silicon component of a powder comprising (1) a preponderant amount of powdered silicon wherein the distribution, by weight, and the particle size, in microns, are as follows: 100% of the particles are smaller than 420 microns in diameter, from 90 to 100% are less than 149 microns in diameter and not more than 60% are less than 44 microns in diameter, and (2) a powdered metallic catalyst for the reaction wherein the distribution, by weight, and the particle size, in microns, are as follows: 100% of the particles are smaller than 420 microns in diameter, from 85 to 100% are smaller than 44 microns in diameter, and from 60 to 100% are smaller than 15 microns in diameter, the two powders being in the form of a substantially homogeneous mixture.

7. The method of obtaining increased yields of dimethyldichlorosilane which comprises effecting reaction at a temperature of from about 200° to 500° C. between gaseous methyl chloride and the silicon component of a powder comprising (1) a preponderant amount of silicon wherein the distribution, by weight, and the particle size, in microns, are as follows: 100% of the particles are smaller than 420 microns in diameter, from 90 to 100% are less than 149 microns in diameter and not more than 60% are less than 44 microns in diameter, and (2) powdered copper wherein the distribution, by weight, and the particle size, in microns, are as follows: 100% of the particles are smaller than 420 microns in diameter, from 85 to 100% are smaller than 44 microns in diameter and from 60 to 100% are smaller than 15 microns in diameter, the two powders being in the form of a substantially homogeneous mixture.

8. The method of obtaining increased yields of dimethyldichlorosilane which comprises bringing gaseous methyl chloride into contact with the silicon component of a powder comprising (1) a preponderant amount of powdered silicon wherein the distribution, by weight, and the particle size, in microns, are as follows: 100% of the particles are smaller than 420 microns in diameter, from 90 to 100% are smaller than 149 microns in diameter and not more than 60% are less than 44 microns in diameter, and (2) powdered copper wherein the distribution, by weight, and the particle size, in microns, are as follows: 100% of the particles are smaller than 420 microns in diameter, from 85 to 100% are smaller than 44 microns in diameter and from 60 to 100% are smaller than 15 microns in diameter, the two powders being in the form of a substantially homogeneous mixture, thereafter heating the said methyl chloride and powder at a temperature sufficiently high to effect reaction between the methyl chloride and the silicon component of said powder.

9. The method which comprises causing gaseous methyl chloride to react with the silicon component of a powder comprising (1) a preponderant amount of powdered silicon wherein the distribution, by weight, and the particle size, in microns, are as follows: 100% of the particles are smaller than 420 microns in diameter, from 90 to 100% are less than 149 microns in diameter and not more than 60% are less than 44 microns in diameter, and (2) powdered copper wherein the distribution, by weight, and the particle size, in microns, are as follows: 100% of the particles are smaller than 420 microns in diameter, from 85 to 100% are smaller than 44 microns in diameter and from 60 to 100% are smaller than 15 microns in diameter, the two powders being in the form of a substantially homogeneous mixture, said reaction being effected within the temperature range of 200° to 500° C., and cooling the effluent gases to obtain a condensate comprising methylchlorosilanes.

10. The method of obtaining increased yields of dimethyldichlorosilane which comprises (a) effecting reaction at a temperature of from 250° to 400° C. between gaseous methyl chloride and the silicon component of a mixture of powders consisting essentially, by weight, of (1) approximately 75 to 95 per cent powdered silicon wherein the distribution, by weight, and the particle size, in microns, of the silicon particles are from 90 to 100 per cent within the particle size range of from 105 to 149 microns in diameter and (2) approximately 25 to 5 per cent powdered copper wherein the distribution, by weight, and the particle size, in microns, of the copper particles are from 80 to 100 per cent smaller than 15 microns in diameter, (b) cooling the effluent gases to obtain a condensate comprising methylchlorosilanes, and (3) isolating dimethyldichlorosilane by fractional distillation.

WILLIAM F. GILLIAM.
ROBERT N. MEALS.

REFERENCES CITED

The following references are of record in the file of this patent:

UNITED STATES PATENTS

| Number | Name | Date |
|---|---|---|
| 2,343,731 | Bailie et al. | Mar. 7, 1944 |

(Other references on following page)

UNITED STATES PATENTS

| Number | Name | Date |
|---|---|---|
| 2,353,505 | Scheineman | July 11, 1944 |
| 2,380,995 | Rochow | Aug. 7, 1945 |
| 2,380,996 | Rochow et al. | Aug. 7, 1945 |
| 2,380,997 | Patnode | Aug. 7, 1945 |
| 2,383,818 | Rochow et al. | Aug. 28, 1945 |
| 2,389,931 | Reed et al. | Nov. 27, 1945 |

FOREIGN PATENTS

| Number | Country | Date |
|---|---|---|
| 270,313 | Great Britain | Sept. 28, 1928 |
| 352,746 | Italy | Sept. 21, 1937 |